US006377859B1

(12) United States Patent
Brown et al.

(10) Patent No.: US 6,377,859 B1
(45) Date of Patent: Apr. 23, 2002

(54) MAINTENANCE INTERFACE DEVICE FOR A USE IN A PROCESS CONTROL NETWORK

(75) Inventors: Larry K. Brown; Brent H. Larson; Harry A. Burns, all of Marshalltown, IA (US)

(73) Assignee: Fisher Controls International, Inc., Clayton, MO (US)

( * ) Notice: Subject to any disclaimer, the term of this patent is extended or adjusted under 35 U.S.C. 154(b) by 0 days.

(21) Appl. No.: 08/983,018

(22) PCT Filed: Oct. 3, 1997

(86) PCT No.: PCT/US97/17861

§ 371 Date: Dec. 30, 1997

§ 102(e) Date: Dec. 30, 1997

(87) PCT Pub. No.: WO98/14855

PCT Pub. Date: Apr. 9, 1998

Related U.S. Application Data

(63) Continuation-in-part of application No. 08/726,265, filed on Oct. 4, 1996, now Pat. No. 5,670,858.

(51) Int. Cl.$^7$ ...................................................... G05B 9/02
(52) U.S. Cl. .............................. 700/79; 700/83; 714/738; 714/739; 714/742; 714/14
(58) Field of Search .................. 710/52, 56; 700/79, 700/83, 1, 9, 87, 17, 18, 131, 86; 714/738, 739, 742, 14; 709/228, 221, 222, 223, 224

(56) References Cited

U.S. PATENT DOCUMENTS

| 4,271,505 | * | 6/1981 | Menot et al. | 370/400 |
| 4,403,297 | | 9/1983 | Tivy | 702/122 |
| 4,627,045 | | 12/1986 | Olson et al. | 370/225 |

(List continued on next page.)

FOREIGN PATENT DOCUMENTS

| 195 10 466 A1 | 10/1996 | (DE) . |
| 0 450 116 A1 | 4/1990 | (EP) . |
| 0 449 458 A1 | 10/1991 | (EP) . |
| 0 546 339 A1 | 6/1993 | (EP) . |
| 0 562 333 A2 | 9/1993 | (EP) . |
| 0 575 150 A2 | 12/1993 | (EP) . |
| 0 604 091 A2 | 6/1994 | (EP) . |
| WO 92/04676 | 3/1992 | (WO) . |
| WO 94/22776 | 10/1994 | (WO) . |
| WO 96/12993 | 5/1996 | (WO) . |

OTHER PUBLICATIONS

HART® Communicator, Fisher–Rosemount Systems, Apr. 1996.

(List continued on next page.)

Primary Examiner—William Grant
Assistant Examiner—McDieunel Marc
(74) Attorney, Agent, or Firm—Marshall, O'Toole, Gerstein, Murray & Borun

(57) ABSTRACT

A maintenance interface device for use in a digital, loop-powered process control network includes an interface to either a two-wire input/output port of a field device or to a two-wire communication media, a control logic for determining a simple status of the field device or communication loop, and a display for displaying the simple status. The maintenance interface device may be used for fault analysis to detect whether a field device or a communication loop is operational or nonoperational, powered or unpowered, and generating a valid communication signal or generating an invalid communication signal. The maintenance interface device is adapted to perform simple functionality tests on a plurality of devices in a process control network including a loop controller, a digital control system, an operator console, a workstation, a personal computer, and a bridge to thereby detect the functionality of those devices on a communication wire. The maintenance interface device is self-powered, powered from the device under service, or powered from a communication media such as a bus.

23 Claims, 8 Drawing Sheets

U.S. PATENT DOCUMENTS

| | | | |
|---|---|---|---|
| 4,691,328 | * 9/1987 | Sterling, Jr. et al. | 364/188 |
| 4,704,607 | 11/1987 | Teather et al. | 340/825.07 |
| 4,831,558 | 5/1989 | Shoup et al. | 364/550 |
| 4,918,690 | 4/1990 | Markkula, Jr. et al. | 370/400 |
| 4,955,305 | 9/1990 | Garnier et al. | 112/475.05 |
| 4,974,625 | 12/1990 | Paullus et al. | 137/85 |
| 4,976,144 | 12/1990 | Fitzgerald | 73/168 |
| 4,988,990 | 1/1991 | Warrior | 340/825.5 |
| 5,014,185 | * 5/1991 | Saito et al. | 364/188 |
| 5,023,869 | 6/1991 | Grover et al. | 370/421 |
| 5,109,692 | 5/1992 | Fitzgerald | 73/168 |
| 5,122,794 | 6/1992 | Warrior | 340/825.2 |
| 5,132,904 | * 7/1992 | Lamp | 364/528.17 |
| 5,148,433 | 9/1992 | Johnson et al. | 714/10 |
| 5,166,678 | 11/1992 | Warrior | 340/870.15 |
| 5,193,189 | 3/1993 | Flood et al. | 709/103 |
| 5,197,328 | 3/1993 | Fitzgerald | 73/168 |
| 5,323,289 | * 6/1994 | Longsdorf et al. | 361/111 |
| 5,404,524 | 4/1995 | Celi, Jr. | 713/2 |
| 5,434,774 | * 7/1995 | Seberger | 364/172 |
| 5,439,021 | 8/1995 | Burlage et al. | 137/84 |
| 5,451,923 | 9/1995 | Seberger et al. | 340/310.06 |
| 5,469,150 | 11/1995 | Sitte | 340/825.07 |
| 5,469,548 | 11/1995 | Callison et al. | 711/114 |
| 5,485,455 | 1/1996 | Dobbins et al. | 370/255 |
| 5,530,643 | 6/1996 | Hodorowski | 700/86 |
| 5,558,115 | 9/1996 | Lenz et al. | 137/86 |
| 5,573,032 | 11/1996 | Lenz et al. | 137/486 |
| 5,592,622 | 1/1997 | Isfeld et al. | 709/207 |
| 5,631,825 | 5/1997 | van Weele et al. | 700/83 |
| 5,650,777 | 7/1997 | Westfield et al. | 340/870.11 |
| 5,684,451 | 11/1997 | Seberger et al. | 340/310.06 |
| 5,784,649 | * 7/1998 | Begur et al. | 710/52 |
| 5,797,043 | * 8/1998 | Lewis et al. | 710/56 |

OTHER PUBLICATIONS

Fieldbus Foundation Manual, Communications Technical Specifications and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

"FIELDVUE® ValveLink™ Series VL2000 Software," Fisher–Rosemount Bulletin 62.1: VL2000, pp. 1–6 (Nov. 1995).

"FIELDVUE® VL2000 Series Software User Guide," Fisher Controls, Version 2.0 (Jun. 1996).

"FIELDVUE® Digital Valve Controller Type DVC5000 Series," Fisher–Rosemount Bulletin 62.1:DVC5000, pp. 1–12 (Jun. 1994).

"FIELDVUE™, Digital Valve Controller DVC5000 Series Remotely Accessible Information," Fisher Controls Bulletin 62.1:DVC5000(S1), pp. 1–2 (Jun. 1994).

"FIELDVUE™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding FOUNDATION™ Fieldbus Technology," 27 pages, 1997.

"FOUNDATION™ Specification, Function Block Application Process," Part 3, 155 pages, 1995–1996.

Fieldbus Foundation™, "Technical Overview," FD–043 Revision 1.0, 29 pages, 1996.

"FOUNDATION™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," INTECH, pp. 92–94 (1989).

PCT International Search Report for PCT/US 97/17713 mailed Jan. 23, 1998.

Office Action mailed Nov. 3, 1997, issued in U.S. Patent Application Serial No. 08/726,265.

PCT Written Opinion issued in PCT application PCT/US97/17861 dated Jul. 27, 1998.

PCT/US 97/17861 International Preliminary Examination Report dated Dec. 30, 1998.

* cited by examiner

MAINTENANCE INTERFACE DEVICE FOR A USE IN A PROCESS CONTROL NETWORK

RELATED APPLICATION

This is a continuation-in-part of U.S. patent application Ser. No. 08/726,265 filed Oct. 4, 1996 now U.S. Pat. No. 5,670,858, Sep. 23, 1997.

FIELD OF THE INVENTION

The present invention relates generally to process control networks and, more specifically, to a maintenance interface device operating in a process control network having distributed control functions.

DESCRIPTION OF THE RELATED ART

Large processes such as chemical, petroleum, and other manufacturing and refining processes include numerous field devices disposed at various locations to measure and control parameters of a process to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having field mounted process control devices, such as valve positioners, transmitters, etc. perform one or more process control functions and by then communicating data across a bus structure for use by other process control devices in performing other control functions. To implement these control functions, each process control device includes a microprocessor having the capability to perform a control function as well as the ability to communicate with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

However, in the evolution of technology to more advanced solutions such as the trend from analog communication protocols to digital communication protocols, issues or problems are raised in addition to the advantages achieved. For example, in conventional communication systems utilizing analog communications, a fundamental level of trouble-shooting and analysis is possible using simple test devices such as inexpensive digital voltmeters or multimeters that test the conductivity of a circuit under test. As communication systems have evolved towards digital communications, an analysis of the functionality of digital devices and communication lines is achieved only using expensive and unwieldy test devices including logic analyzers and communication systems because the conductivity in digital devices and communication lines measured by conventional voltmeters and multimeters may be excellent while the digital signal indicative of a device failure remains undetected.

In the harsh environment of, for example, oil and gas pipelines, nuclear power generating stations or factories, gaining access to a control valve or other device is often difficult. Finding an electrical outlet is often even more daunting. It is desirable, therefore, to use a simple apparatus and technique for performing a fundamental analysis of the functionality of peripheral field devices connected within a process control system in which communications follow a digital communication protocol.

SUMMARY OF THE INVENTION.

The present invention is directed to a maintenance interface device for use in a digital, loop-powered process control network that includes an interface to either a two-wire inputloutput port of a field device or to a two-wire communication media, control logic that determines a simple status of the field device or communication loop, and a display that displays the status. The maintenance interface device may be used in fault analysis to detect whether a field device is operational or nonoperational.

In accordance with one aspect of the present invention, a maintenance interface device for use in a digital, loop-powered process control network determines whether a device or communication media is operational or nonoperational, whether a device or communication media is powered or unpowered, and whether a device or communication media generates or carries a valid digital signal or an invalid signal. The maintenance interface device is adapted to perform simple functionality tests on a plurality of devices in a process control network including a loop controller, a digital control system, an operator console, a workstation, a personal computer, and a bridge to detect functionality of devices on a bus.

In accordance with another aspect of the present invention, a maintenance interface device for use in a digital, loop-powered process control network is alternatively self-powered (typically using battery power), is powered by the device under service or is powered from the two-wire loop-powered media.

Many advantages are achieved by the described maintenance interface device and operating method. For example, the maintenance interface device is portable and powered either from the two-wire media, the device under test or a battery making the maintenance interface device useable in inhospitable or inconvenient environments where power is otherwise unavailable.

DESCRIPTION OF THE PREFERRED EMBODIMENTS

Figure 1:
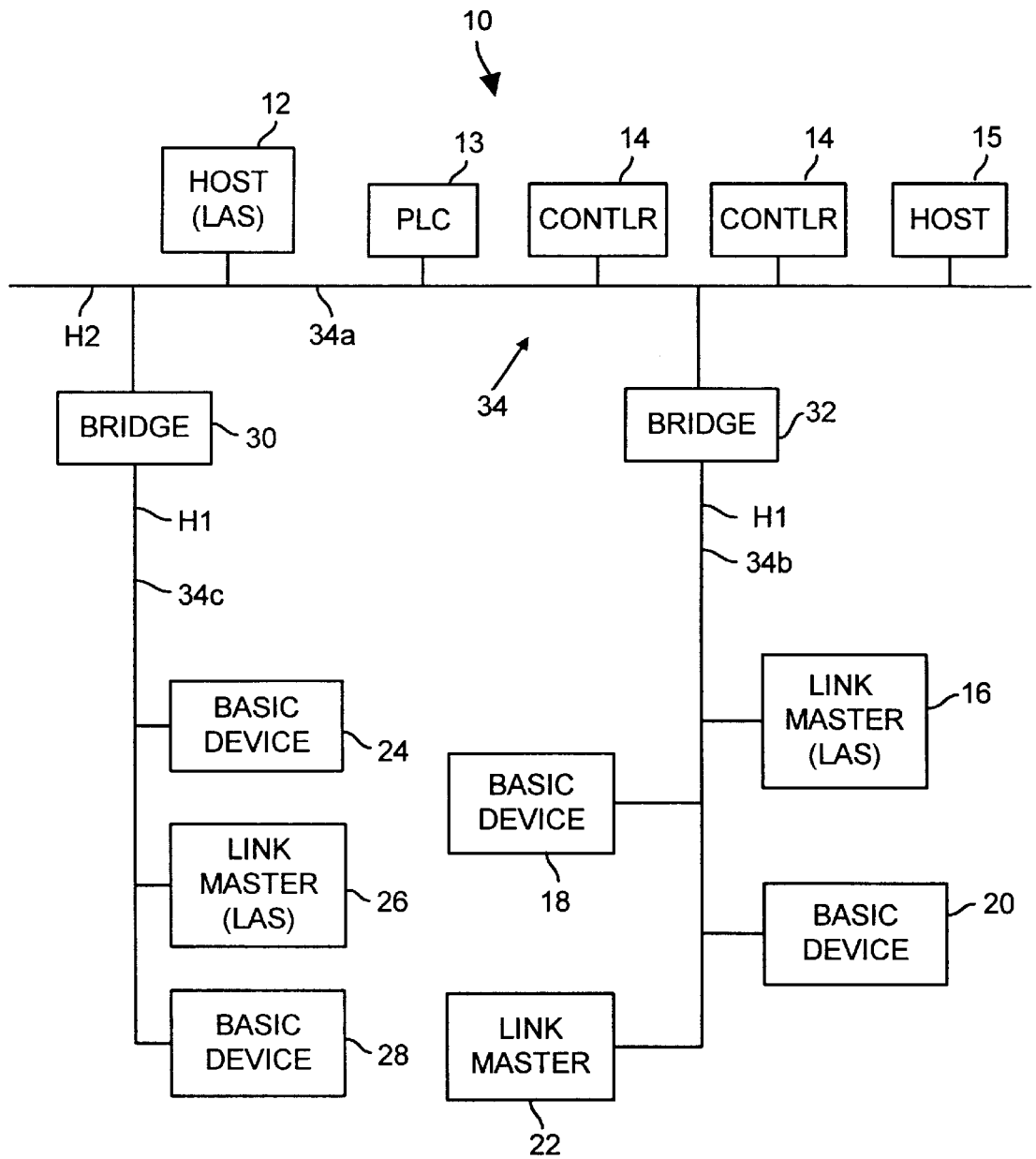
FIG. 1 is a schematic block diagram of an example process control network using Fieldbus protocol.

While the maintenance interface device of the present invention is described in detail in conjunction with a process control network that implements process control functions in a decentralized or distributed manner using a set of Fieldbus devices, it should be noted that the maintenance interface device of the present invention can be used with process control networks that perform control functions using other types of field devices and communication protocols, including protocols that rely on other than two-wire buses and protocols that support analog and digital communications.

Thus, for example, the remote maintenance interface device of the present invention can be used in any process control network that performs distributed control functions even if this process control network uses the HART, PROFIBUS, etc. communication protocols or any other communication protocols that now exist or that may be developed in the future. Likewise, if desired, the maintenance interface device of the present invention can be used in process control networks that do not have distributed control functions but, instead, that use a centralized controller or control scheme to control the devices therein.

Before discussing the details of the maintenance interface device of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby incorporated by reference in their entirety herein.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configure is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, recognizing data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and a 1.0 Mbit/s and/or a 2.5 Mbitls (H2) communication rate, which will be typically used for advanced process control, remote input/output, and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three primary categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of a function block, is controlled manually; an out-of-service mode in which the block does not operate;

a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
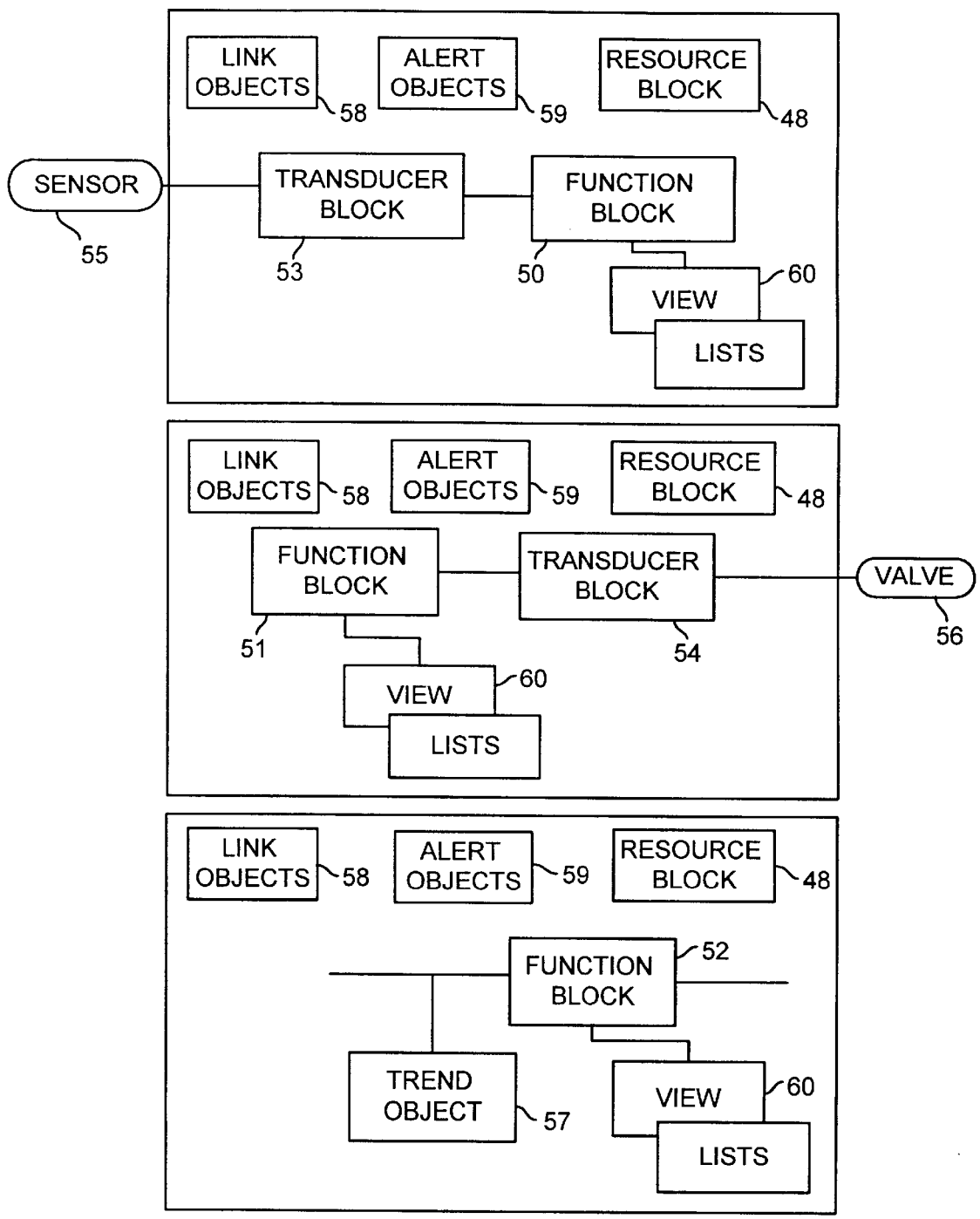
FIG. 2 is a schematic block diagram of Fieldbus devices having function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

Figure 3:
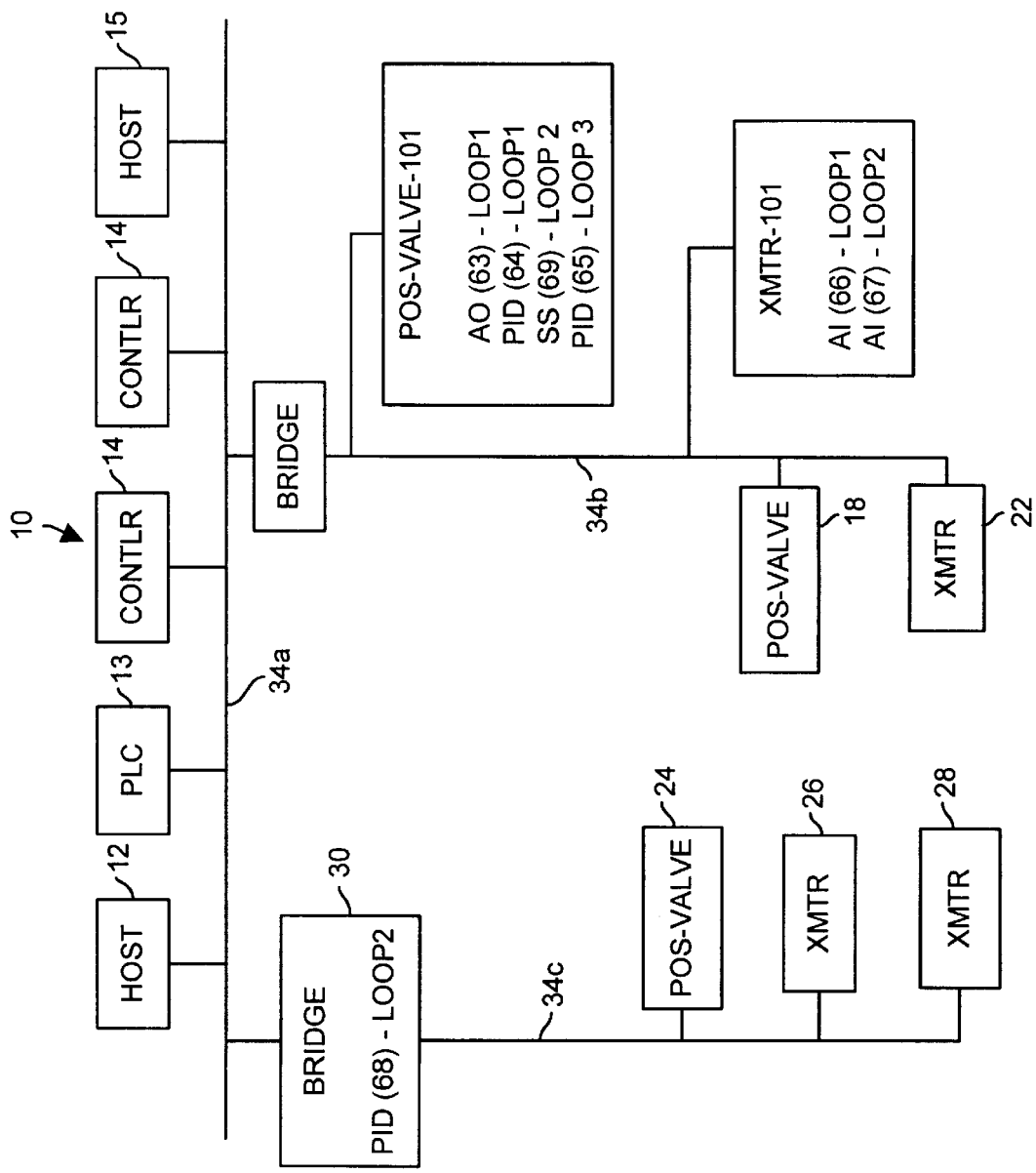
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDCR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
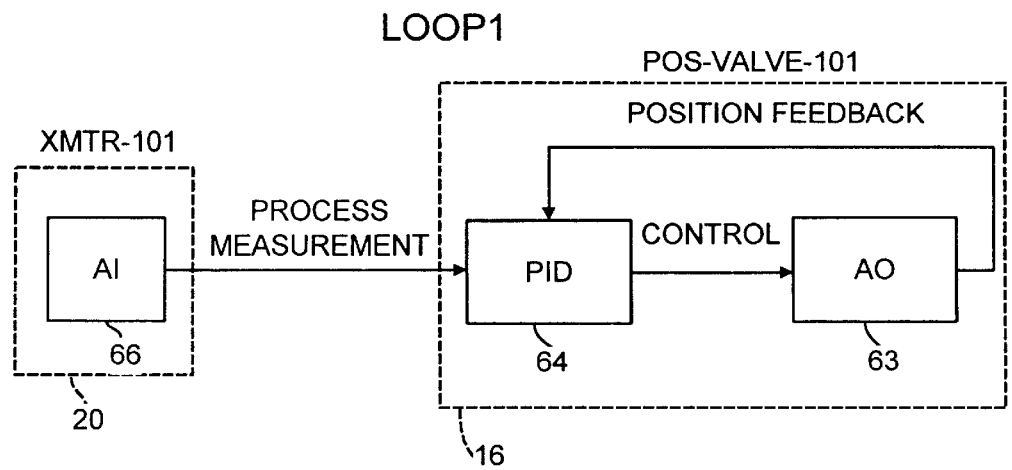
FIG. 4 is a control loop schematic for a process control loop within the press control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
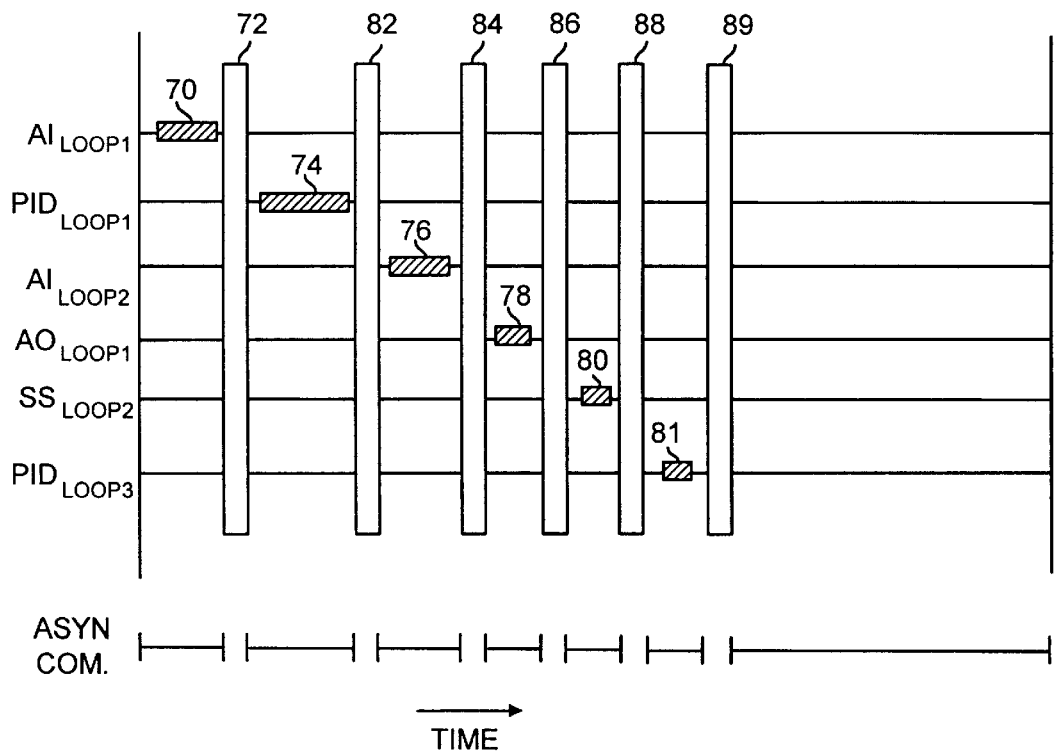
FIG. 5 is a timing schematic for a macrocycle of a segment of the bus of the process control network of FIG. 1.

FIG. 5 illustrates a timing schematic depicting the times at which function blocks on the bus segment 34b of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{LOOP1}$ refers to the AI function block 66 of the transmitter 20, $PID_{LOOP1}$, refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{LOOP1}$ function block executes first for the time period specified by the box 70. Then, during the time period indicated by the vertical bar 72, the output of the $AI_{LOOP1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications.

For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a user and are implemented within the process control network 10 using a configuration application located in, for example, the host 12. However, after being configured, the process control network 10 operates without any consideration for device or process diagnostics and, therefore, interfaces with the host 12 to perform standard I/O functions, but not diagnostic functions.

Figure 6:
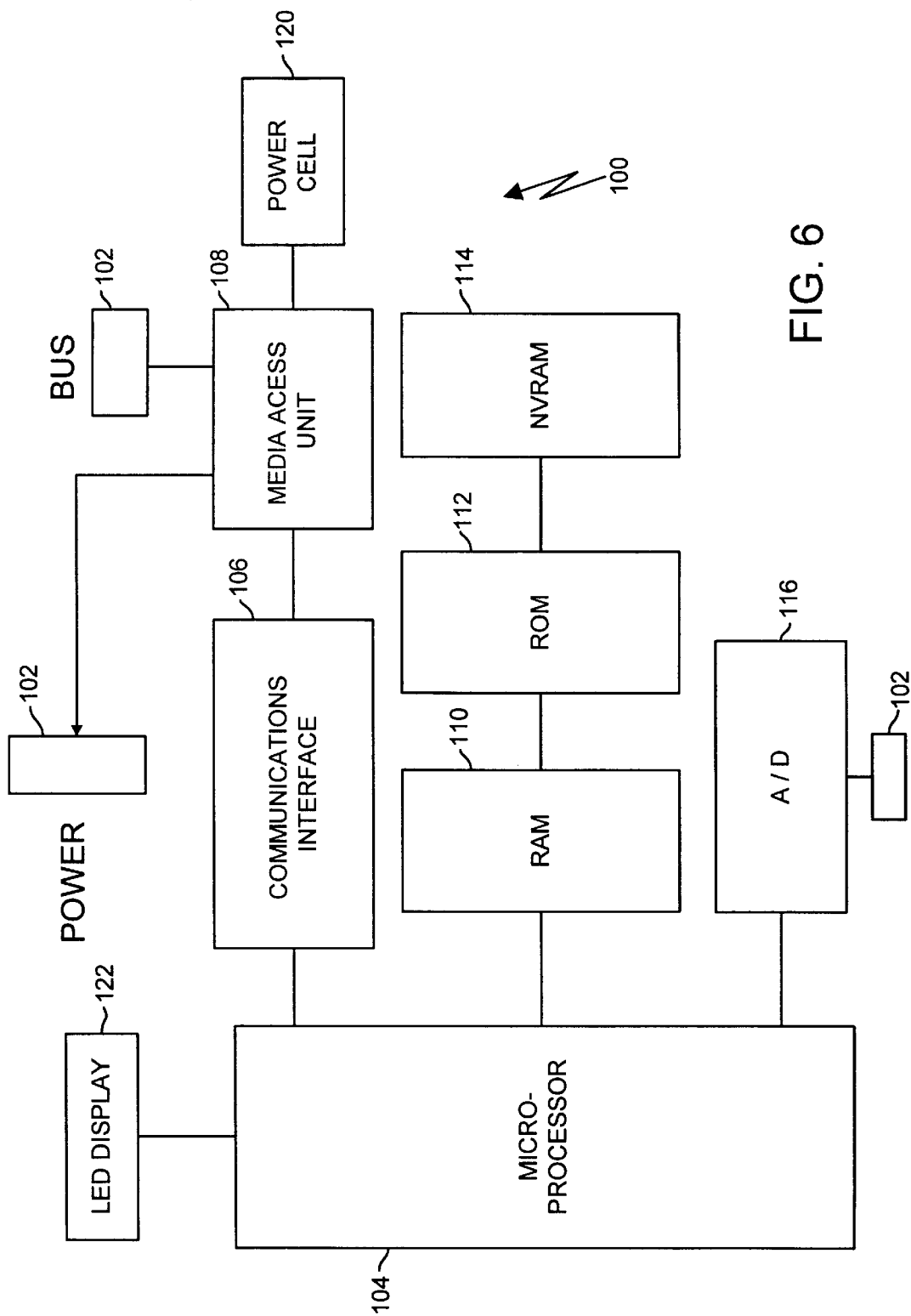
FIG. 6 is a schematic block diagram illustrating a maintenance interface device in a process control network according to the present invention.

Referring now to FIG. 6, a schematic block diagram illustrates a maintenance interface device 100 which may be used in any process control system implementing, for example, an SP-50 communication protocol, such as a Fieldbus or Profibus protocol or which may be used in any other digital, two-wire, or loop powered communication system. The maintenance interface device 100 has a two-wire terminal block 102 that connects to a communication loop, such as the two-wire media of a Fieldbus system, or that connects to a communication connection terminal of a device under test. Of course, the maintenance interface device may be connected to and used with any type of device that uses the communication protocol for which the maintenance interface was designed including, for example, any transmitter, valve, valve positioner, sensor, wall-mounted panel, etc.

The maintenance interface device 100 includes a microprocessor 104, a communications interface 106, a media access unit 108, a plurality of storage devices such as a random access memory (RAM) 110, a read-only memory (ROM) 112 and a nonvolatile random-access memory (NVRAM) 114, a signal processing device such as an analog-to-digital converter 116, a power cell 120 and a multiple-bit LED display 122. The interface 106 is a circuit that performs serial to parallel protocol conversion and parallel to serial protocol conversion and is used to add framing information to data packets according to any desired protocol definition, such as the Fieldbus protocol. The media access unit 108 is a circuit that is used to convert a, for example, two-wire media communication signal on the bus 34 to a digital representation of the communication signal. The media access unit 108 also includes a power coupler that supplies power received from the bus 34 or, if power is unavailable from these sources, from the power cell 120, to other circuits in the maintenance interface device 100. The media access unit 108 also performs wave-shaping and signaling on the two-wire media and the interface 106 forms an interface between the media access unit 108 and the microprocessor 104.

The storage devices 110, 112 and 114 supply memory to the maintenance interface device 100, directly interfacing with the microprocessor 104. In the illustrated embodiment, the RAM 110 may be a 128 Kbyte storage unit, the ROM 112 may be a 256 Kbyte storage and the NVRAM 114 may be a 32 Kbyte nonvolatile storage. As illustrated in FIG. 6, the A/D converter 116 is connected to the two-wire terminal block 102 to receive a digital signal from the two-wire media or the device under test.

The maintenance interface device 100 executes instructions in the microprocessor 104 from a program code stored in one or more of the storage devices 110, 112, or 114 to perform functional tests of a functional device and displays the results of the functional tests using the LED display 122. The LED display 122 either includes multiple individual LED lights or one or more multicolor LED lights for displaying a status condition of a functional device. In some embodiments, the LED display 122 includes one light or light color to display: (1) whether power is available to a device, (2) whether a short-circuit condition is present, (3) whether an open-circuit condition is present, (4) whether digital communication signals are currently being generated, (5) whether digital communication signals are currently being generated in response to signals sent by the maintenance interface device 100, and (6) whether the digital communication signals received by the maintenance interface device 100 are of a suitable quality.

Figure 7:
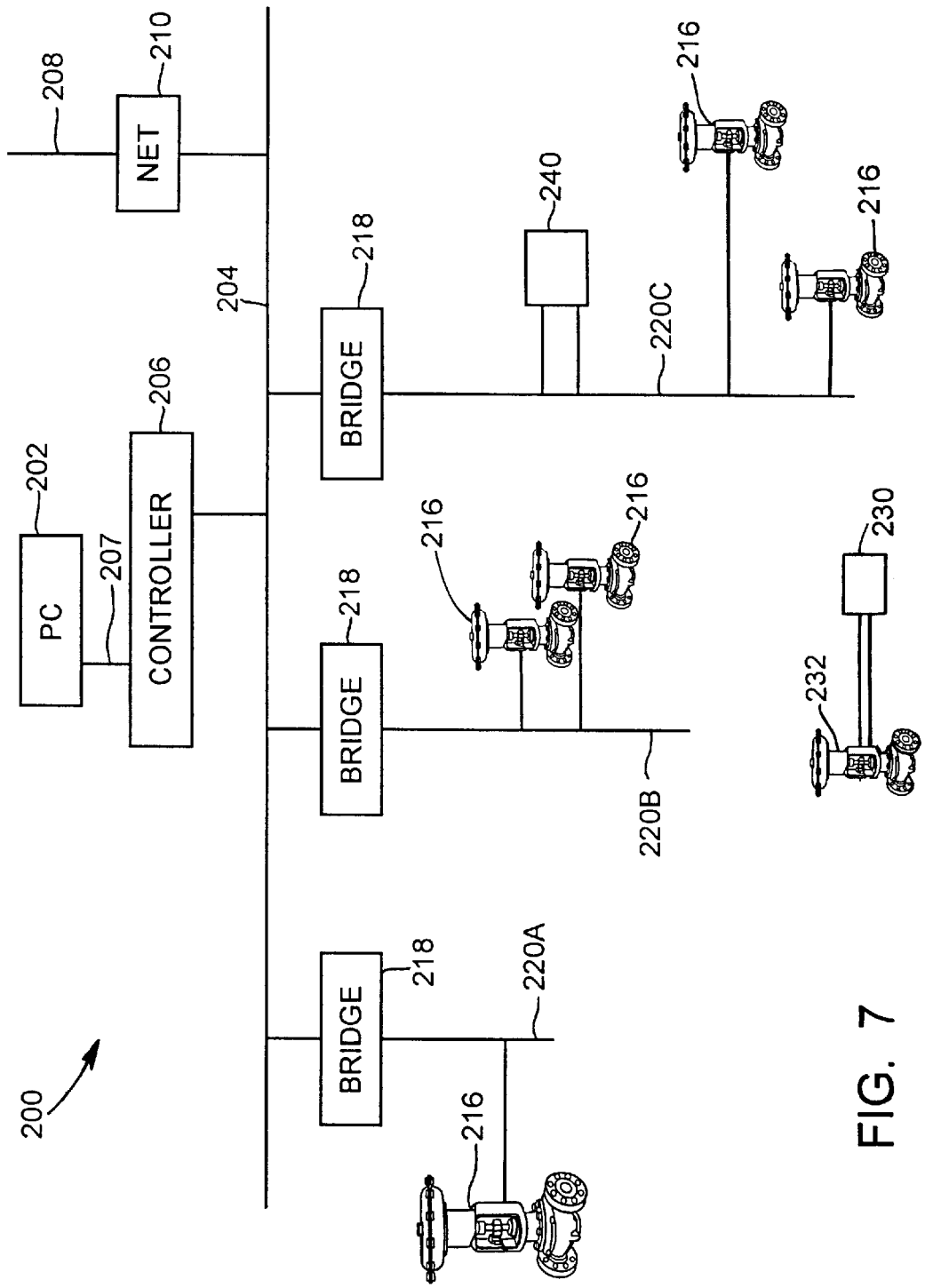
FIG. 7 is a schematic block diagram illustrating a control system network incluing devices and functional elements capable of being tested by the maintenance interface device illustrated in FIG. 6.

Referring now to FIG. 7, a schematic block diagram illustrates a control system network 200 including devices and functional elements that may be tested by the maintenance interface device 100. The illustrated control system network 200 includes a computer 202, such as a personal computer or a workstation, connected to a network bus 204 via a controller 206, such as a digital control system. The control system network 200 communicates with an external network 208 by a connection of the network bus 204 at a node 210. The control system network 200 includes a plurality of field devices 216 that are connected to the network bus 204 directly or are connected to the network bus 204 at a bridge 218. The field devices 216 are each connected to the network bus 204 through a bridge 218 and are connected to one of the bridges 218 using a local bus 220A, 220B or 220C. Each bridge 218 is typically used to transfer data from a higher frequency bus to a lower frequency bus in a Fieldbus network.

The maintenance interface device 100 is illustratively shown connected in two manners of connection. A first maintenance interface device (labeled 230) is directly connected to a field device 232 that is not connected to the control system network 200, but may be so connected in any desired manner. A second maintenance interface device (labeled 240) is connected to one of the local buses 220C for directly testing the bridge 218 and the field devices 216 associated with the bus 220C and for indirectly testing the controller 206 and the computer 202. A maintenance interface device 100 may alternatively test the computer 202 directly by connecting to the bus 207 between the computer 202 and the controller 206. Likewise, a maintenance interface device 100 may be connected to the network bus 204 to directly test the controller 206. Thus the maintenance interface devices 230 and 240 (which are similar in construction to the device 100 of FIG. 6) may be connected to various locations of various buses to test power and digital communications of a plurality of different device types.

In some embodiments, the maintenance interface device 230 or 240 simply reads digital communication signals that are generated by various functional devices on the buses 204, 207, 220, etc. In other embodiments, the maintenance interface device 100 not only monitors digital communications but also generates digital communications to evoke a response from a functional device on the buses 204, 207 and 220.

For example, a bridge 218 may operate as a link master device (in a Fieldbus system) and generate digital communication signals that are analyzed by the maintenance interface device 100 to determine whether the bridge 218 is functioning properly. However, under some operating conditions the bridge 218 generates digital communication signals only intermittently. Fault testing is facilitated by the maintenance interface device 100 generating digital communication signals to evoke a response by the bridge 218 which then allows the maintenance interface device to read and test the response of the bridge 218.

The network bus 204 and the local buses 220 are powered loops so that operating power is applied to devices attached to the buses. In some embodiments, the maintenance interface device 230 or 240 exploits the power supplied by the buses and operates using the supplied power. In these embodiments, the maintenance interface device 230 or 240 also preferably has a battery backup (power cell 120) so that field devices can be tested even when power in the bus is interrupted. In other embodiments, the maintenance interface device 100 always operates on battery power.

The control system network 200 including devices and functional elements that are tested by the maintenance interface device 230 or 240 is operational for loops implementing, for example, two-wire, loop-powered, two-way digital communications including loops implementing a FieldBus standard (FieldBus Foundation, Austin, Tex.), a WORLDFIP standard, a LONWORKS standard, a Profibus standard, a DeviceNET standard, and the like. The control system maintenance interface device 230 and 240 is also operational for loops implementing mixed analog/digital protocols including a HART standard.

Figure 8:
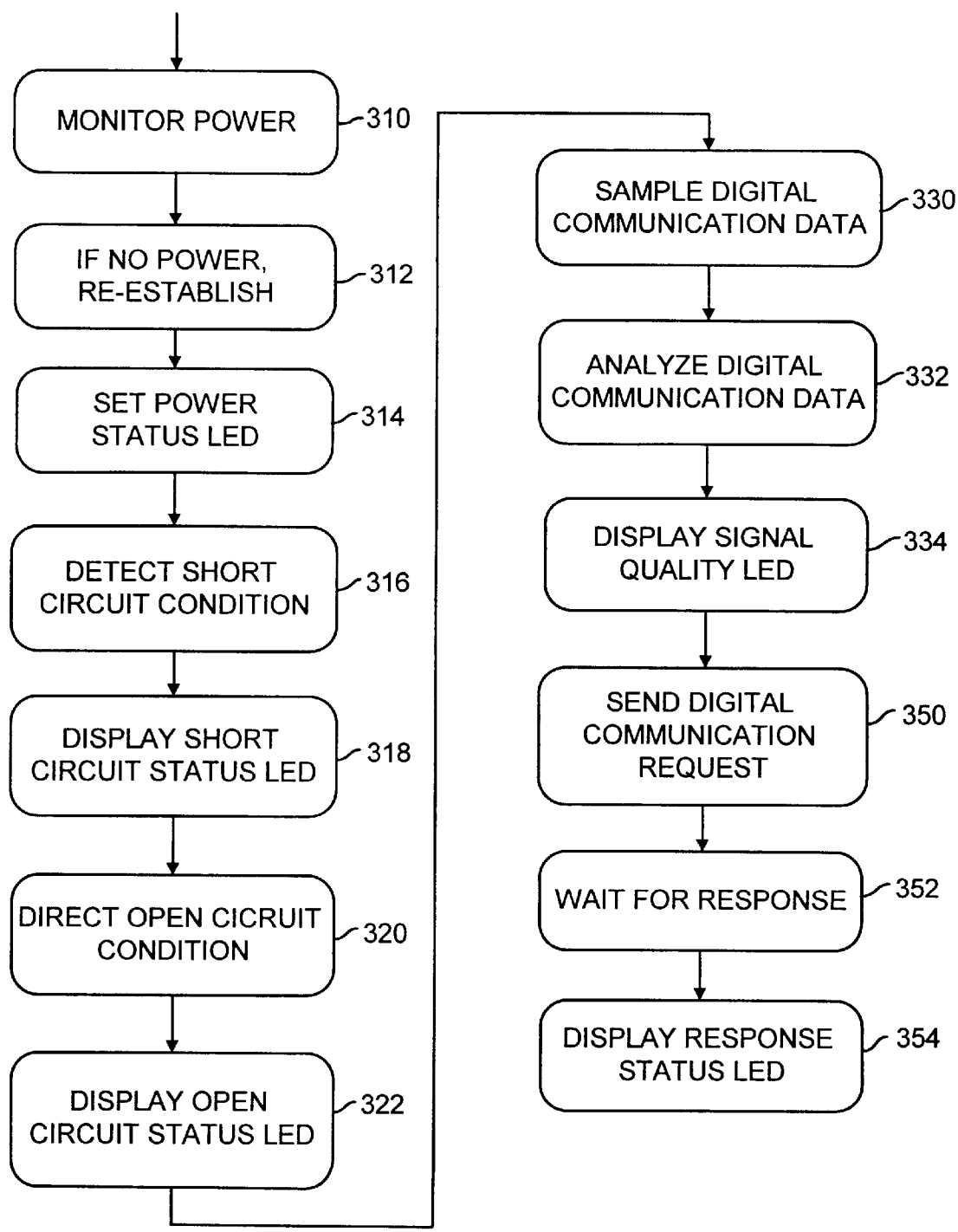
FIG. 8 is a flow chart illustrating operations of a status and fault analysis program performed in an embodiment of the maintenance interface device of the present invention.

Referring to FIG. 8 in combination with FIG. 6, a flow chart illustrates operations of a status and fault analysis program 300 performed in an embodiment of the maintenance interface device 100, 230 or 240 (for convenience labeled as the device 100). Although the illustrated operations are executed by the microprocessor 104 from a program code stored in one or more of the storage devices 110, 112, 114, the operations may also be controlled and performed using other control logic, either analog or digital.

In a step 310, power is monitored at the bus isolation circuit 108 to determine whether power is applied to the device or communication loop. The lack of power to a device or to the two-wire media is indicative that the two-wire media is broken or interrupted. In some embodiments, if power is not available, the maintenance interface device 100 re-establishes or supplies power to the device under test in step 312 so long as the maintenance interface device 100 has a sufficient power supply. In a step 314, the maintenance interface device 100 sets an LED of the LED display 122 if the power level is sufficient and otherwise leaves the LED unlit. Note that, in alternative embodiments, the LED may be lit to indicate that power is not sufficient and that LED and other displays may be used in any desired manner to display status information to a user. In further embodiments, two LEDs may be used, one indicating that the power is sufficient and one indicating that the power is insufficient. In this case, only one of the two LEDs is lit to indicate unambiguously the status of the device under test. In embodiments of the maintenance interface device 100 that do not supply power or have an insufficient power cell for supplying power under test conditions, the maintenance interface device 100 monitors the power level but does not supply power.

In a step 316, a short-circuit condition of the device or communication loop is detected by comparing the power signal voltage to a maximum allowable voltage in the processor 104 which, in this case, comprises a failed-circuit detection circuit. If the power signal amplitude is larger than the allowable maximum then a short-circuit condition is present. The maintenance interface device 100 displays the condition on a designated LED of the LED display 122 in a step 318. Similarly, in a step 320, an open-circuit condition of the device or communication loop is detected by comparing the power signal voltage to a minimum allowable voltage in the processor 104 which, in this case, comprises a failed-circuit detection circuit. If the power signal amplitude is lower than the allowable minimum, an open-circuit condition is present. The maintenance interface device 100 displays the condition on a designated LED of the LED display 122 in a step 322.

Figure 9:
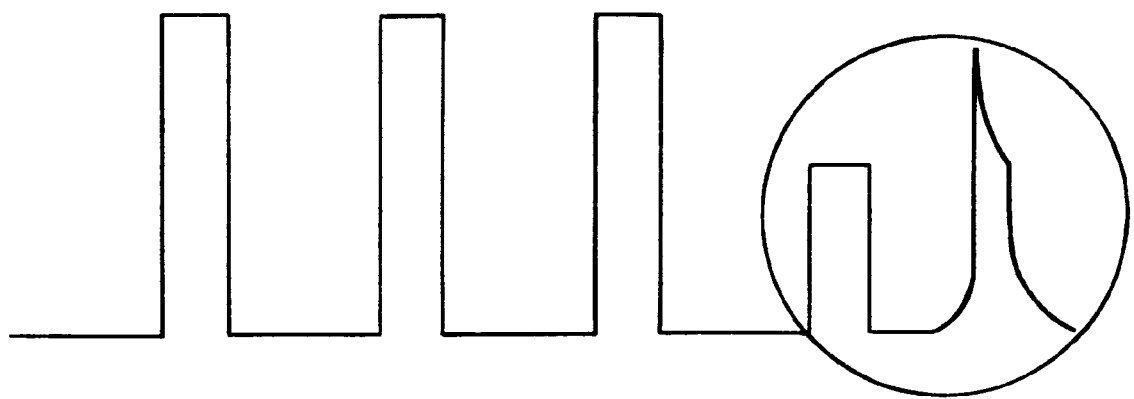
FIG. 9 is a pictorial illustration showing an example of a digital communication signal that is analyzed using the status and fault analysis program performed in an embodiment of the maintenance interface device according to the present invention.

In a step 330, signal data sensed by the A/D converter 116 is sampled for analysis. The A/D converter 116 generates a proportional, digital value based on the voltage applied to the two-wire terminal block 102. In a step 332, the sampled signal data is analyzed to determine the digital signal quality, indicating whether the digital communications are valid digital communication signals. Referring to FIG. 9, a pictorial illustration shows an example of a digital communication signal that is analyzed in the step 332 of the status and fault analysis program. The waveform sampled by the A/D converter 116 is analyzed with respect to amplitude, digital pulse width, timing and morphology to determine whether the digital communication signal is suitable or valid. Unsuitable digital communication signals are indicative of many possible problems. For example, unsuitable digital communication signals may be caused by a noise source in the vicinity of the media or a device connected to the media. Unsuitable digital communication signals are also caused by stress or intermittent breakage of the two wire media and other conditions. The maintenance interface device 100 displays the condition of the digital signal quality on a designated LED of the LED display 122 in a step 334. Of course, if desired, the maintenance interface device may include a communications stack or other hardware and software necessary for actually detecting and reading the content of the messages on the bus to determine if these messages are meaningful.

In a step 350, the maintenance interface device 100 generates a digital communication signal in the communications protocol used by the process control network and sends the signal to a device at a selected address. In a step 352, the maintenance interface device 100 waits a predetermined time for a response from the device at the selected address. If the time expires without response, a failure to respond status is present for the device at the selected address. In a step 354, the maintenance interface device 100 displays the failure to respond status on a designated LED of the LED display 122.

Of course, the maintenance interface device 100 may perform other tests as desired and may perform any combination of tests in any desired order. Furthermore, while the maintenance interface device has been described herein as being used in performing diagnostics on (or using) positioner/valve devices, it is noted that this interface device can be used to perform diagnostics on (or using) other types of devices, such as those having moveable elements like dampers, fans, etc., as well as controllers, bridge devices, sensors, etc.

Moreover, although the maintenance interface device described herein is preferably implemented in software stored in, for example, a process control device, it may alternatively or additionally be implemented in hardware, firmware, etc., as desired. If implemented in software, the maintenance interface device of the present invention may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the internet, etc. Still further, although the maintenance interface has been described herein as including an LED display, it may alternatively use any other type of display including, for example, a CRT screen, a gas-plasma display, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A portable maintenance interface device for use in a process control system comprising:

an interface implementing a two-wire, two-way, loop-powered digital communication protocol for connecting to an element in the process control system;

a power detection circuit coupled to the interface for detecting the presence and absence of an operating power in the element; and a display coupled to the power detection circuit and that displays a status of the operating power based on the presence of the operating power in the element.

2. The maintenance interface device of claim 1, further including a digital communication signal detection circuit coupled to the interface that detects the presence and absence of a digital communication signal in the element and wherein the display is coupled to the digital communication signal detection circuit and displays a status of the presence of the digital communication signal in the element.

3. The maintenance interface device of claim 2, further including a communication signal generating circuit coupled to the interface that generates and transmits an interrogate digital communication signal to the element to evoke a reply digital communication signal.

4. The maintenance interface device of claim 2, wherein the digital communication signal detection circuit detects a quality of the digital communication signal in the element and the display displays a status of the quality of the digital communication signal in the element.

5. The maintenance interface device of claim 1, further including a power coupler connected to the interface that receives an operating power from the element.

6. The maintenance interface device of claim 1, further including a power supply coupled to the interface that generates an operating power.

7. The maintenance interface device of claim 1, further including a power supply coupled to the interface that generates a self-operating power and that generates a further power for the element, wherein the further power is supplied to the element when the power detection circuit detects the absence of the operating power in the element.

8. The maintenance interface device of claim 1, wherein the power detection circuit further includes a failed-circuit detection circuit that detects a short-circuit power status of the element and that detects an open-circuit power status of the element.

9. The maintenance interface device of claim 1, wherein the element in the process control system is a field device.

10. The maintenance interface device of claim 1, wherein the element in the process control system is a two-wire control media and the maintenance interface device is connected to the two-wire control media for detecting a power signal status of an element selected from among a group including:

a loop controller, a digital control system, an operator console, a workstation, a personal computer, and a bridge.

11. A maintenance interface device for use in a process control system comprising:

an interface implementing a two-wire, two-way, loop-powered digital communication protocol for connecting to an element in the process control system;

a power detection circuit coupled to the interface for detecting the presence and absence of an operating power in the element; and a display coupled to the power detection circuit and that displays a status of the operating power based on the presence of the operating power in the element, wherein the two-wire, two-way, loop-powered digital communication protocol includes an SP-50 communication protocol.

12. The maintenance interface device of claim 11, wherein the two-wire, two-way, loop-powered digital communication protocol further includes a Profibus communication protocol.

13. The maintenance interface device of claim 11, wherein the two-wire, two-way, loop-powered digital communication protocol further includes a Fieldbus communication protocol.

14. A portable maintenance interface device comprising:
   an interface implementing a two-wire, two-way, loop-powered digital communication protocol for connecting to an element in a process control system;
   a power detection circuit coupled to the interface for detecting the presence and absence of an operating power in the element;
   an analog-to-digital converter coupled to the interface for connecting to the element in the process control system and acquiring a digital communication signal;
   a controller coupled to the power detection circuit and coupled to the analog-to-digital converter including;
     a first control logic that analyzes the operating power of the element; and
     a second control logic that analyzes the digital communication signal to detect the presence and absence of a digital communication signal in the element; and
   a display coupled to the power detection circuit and coupled to the controller that displays a status of the operating power based on the presence of the operating power in the element and that displays a status of the presence of the digital communication signal in the element.

15. The maintenance interface device of claim 14, wherein the second control logic analyzes the digital communication signal to detect a quality of the digital communication signal and the display displays a status of the quality of the digital Communication signal.

16. The maintenance interface device of claim 14, wherein the controller includes a processor, a storage coupled to the processor and a program code stored in the storage that executes on the processor to implement the first and second control logic functions.

17. The maintenance interface device according to claim 14, further comprising a power coupler connected to the interface to receive an operating power from the element.

18. The maintenance interface device of claim 14, further including a power supply coupled to the interface for generating an operating power.

19. The maintenance interface device of claim 14, further including a power supply coupled to the interface that generates a self-operating power and that generates a further power for the element, wherein the further power is supplied to the element when the power detection circuit detects the absence of the operating power in the element.

20. The maintenance interface device of claim 14, further including a communication signal generating circuit coupled to the interface that transmits an interrogate digital communication signal to the element to evoke a reply digital communication signal.

21. A maintenance interface device for use in a process control system comprising:
   an interface implementing a two-wire, two-way, loop-powered digital communication protocol for connecting to an element in the process control system;
   a digital communication signal detection circuit coupled to the interface to detect the presence and absence of a digital communication signal in the element; and
   a display coupled to the digital communication signal detection circuit that displays a status of the presence of the digital communication signal in the element,
   wherein the two-wire, two-way, loop-powered digital communication protocol includes an SP-50 communication protocol.

22. The maintenance interface device of claim 21, further including a communication signal generating circuit coupled to the interface that generates and transmits an interrogate digital communication signal to the element to evoke a reply digital communication signal.

23. The maintenance interface device of claim 21, wherein the digital communication signal detection circuit detects a quality of the digital communication signal in the element and the display displays a status of the quality of the digital communication signal in the element.

* * * * *